United States Patent

Gu et al.

[11] Patent Number: 5,881,023
[45] Date of Patent: Mar. 9, 1999

[54] SELF-CORRECTING CLOCK

[76] Inventors: Jing-Lu Gu, 2355-B Paragon Dr., San Jose, Calif. 95131; Robin Schneyer, 3470 Brookdale Dr., Santa Clara, Calif. 95051

[21] Appl. No.: 946,085

[22] Filed: Oct. 7, 1997

[51] Int. Cl.$^6$ .................................................. G04B 47/00

[52] U.S. Cl. ............................................. 368/10; 368/46

[58] Field of Search ..................... 368/46, 10, 4

[56] References Cited

U.S. PATENT DOCUMENTS

| 3,643,420 | 2/1972 | Haydon | 368/59 |
| 3,653,204 | 4/1972 | Miwa | 368/22 |
| 3,861,134 | 1/1975 | Chacon et al. | 368/48 |
| 5,481,258 | 1/1996 | Fawcett et al. | 340/825.47 |

*Primary Examiner*—Bernard Roskoski

[57] ABSTRACT

A clock synchronized by date and time information taken from Caller ID information packets delivered with incoming calls on a telephone line provided with Caller ID service.

5 Claims, 3 Drawing Sheets

SELF-CORRECTING CLOCK

BACKGROUND OF THE INVENTION

1. Field of the Invention

This invention relates generally to clocks, and more particularly to techniques for guaranteeing the accurate synchronization of clocks. It also relates to telephony applications based on Caller ID delivery.

2. Brief Description of Prior Art

Clocks have been around since the first sundial, and the problem of making them report time accurately has been a continuing struggle for all of recorded history. Pendulum, flywheel and spring driven clocks are of modest accuracy, requiring manual correction anywhere from monthly to daily if one intends to report time accurate to a couple of minutes. Nonetheless they are sufficiently accurate for average human needs and many of them still serve today. The advent of modern electrical AC power, with its highly accurate alternations, led to clocks that rarely needed correction more than once a month, and they could generally report time accurate to the minute. Corrections for this type of clock are usually still performed manually, and as a result a clock may be inaccurate by up to several minutes over prolonged periods of time without being noticed and corrected. Interruptions in electric power supply, which happen virtually everywhere in the world from time to time, then demand correction. Self-contained clocks synchronized by crystal oscillation, such as modern battery-powered watches or the timers in computers, vary as little as a few seconds per month, and hence need only very infrequent resetting. These generally also rely on a manual correction technique, and thus on the notice and control of a human being.

The above types of clocks probably comprise the majority of clocks currently in use in the world today. Timekeeping in certain applications requires greater regularity than common clocks deliver. Institutions which run on an exacting schedule, such as large factories, schools, railway systems etc., often have clock systems where individual clocks are all connected to a correction circuit driven by a central clock which delivers a pulse once per minute, advancing all clocks with the same pulse. This system guarantees agreement among all clocks nearly to the second, and manual intervention is required only after a system-down event. The central clock is declared the "official" time. A particular example of such institutions, pertinent to the current invention, is the local telephone service provider, which for billing and other reasons maintains a central clock tightly synchronized with legal official time. Recently such providers have been required to offer a service known as "Caller ID" throughout the United States and Canada. The Caller ID is an information packet sent over the telephone transmission route which contains (among other things) the calling number and the date and time of the call.

Radio-controlled clock systems allow extremely accurate synchronization of clocks over wide distances of separation, especially where the clocks are not stationary (ships and aircraft, for example), or where it is difficult or impossible to lay electrical wiring infrastructure. Conklin et al., U.S. Pat. No. 4,823,328, demonstrates such a clock system, and Cateora et al., U.S. Pat. No. 4,014,166 even uses a satellite as a broadcast source. Here the "official" time is the controlling clock at the broadcast source, which might even be an atomic clock at a standards institution. Such broadcast clock systems are very costly to operate, and the receiving clock stations are sophisticated and costly devices. With them, however, manual intervention for setting is no longer required.

It is an object of this invention to create a clock which can be produced and operated at a low cost, which is accurate to standard official time within a tolerance sufficient for everyday usage, but without the need for manual setting intervention.

SUMMARY OF THE PRESENT INVENTION

The current invention is an apparatus and method comprising a microprocessor controller, a Caller ID decoding chip, and one or more clock displays capable at least of displaying the time or date or both. The operation of the clock presumes the presence of an incoming telephone line with Caller ID service. When a call arrives (and no one answers before the second ring), a Caller ID packet is decoded by the decoding chip. The microprocessor reads the packet, and compares the packet date and time to its internal time register. If there is a difference, the register is updated, and the microprocessor updates the clock displays with the newly received date and time. Between updates via Caller ID, the microprocessor updates its internal time register and the displays as necessary via its own continuing cycle-counting time calculations. Thus the clock operates between calls with the accuracy of a crystal oscillation clock apparatus, and at each effective incoming call verifies the maintained time to within the accuracy of the Caller ID date/time contents. Manual setting is not required. If the clock displays are capable, they can also display the incoming caller telephone number, thus allowing the unit to double as a Caller ID display during ringing, and the full array of common Caller ID functions such as recorded or synthesized speech recital of received data, maintaining and viewing a log, telephone ring suppression or special ringing, dialing from log or internal directory, etc. may also be implemented by adding appropriate hardware and appropriate software control. In addition, adding other appropriate hardware and software control can allow the clock to perform other standard well-known clock functions, such as a timed alarm or bell, or as a timed switch controller for external functions.

DETAILED DESCRIPTION OF THE INVENTION

Figure 1:
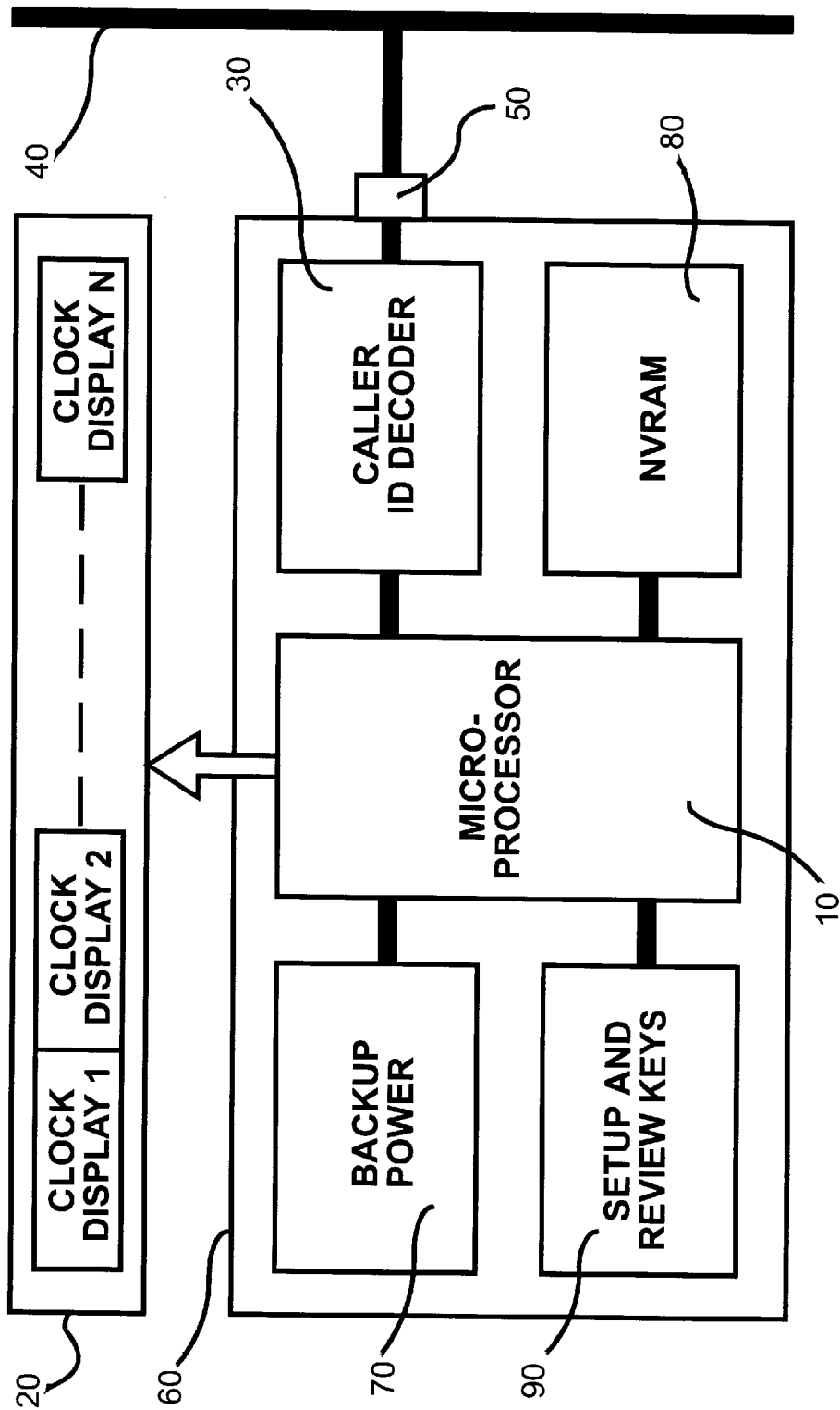
FIG. 1 is a block diagram of the functional hardware components of the present invention.

Referring to FIG. 1, the system is controlled by microprocessor 10. Using a standard counter function, the microprocessor continuously updates its internal date/time register, and sends display signals to clock displays 20, updating them at normal standard boundaries. The microprocessor also either polls continuously, or accepts an interrupt from Caller ID Decoder chip 30 to determine when Caller ID information is ready. The microprocessor then reads that information, and updates its internal date/time register and the clock displays 20 as appropriate. External Caller ID telephone line 40 is connected to Caller ID Decoder chip 30 through a standard telephone line plug 50 in the housing 60 of the control unit. The power source (not shown) for the entire clock is standard wall-outlet electricity, however the microprocessor is supplied with a backup battery 70 which allows it to continue time-keeping even if the external power supply is interrupted. Non-volatile memory 80 may also be present to maintain logs or other data. In the preferred embodiment, the Caller ID chip chosen is the Motorola MC145447, and the microprocessor chosen is the ATMEL 8951 which has sufficient on-chip RAM to store both the date/time register and a log of calls, and no external NVRAM is required. In the same preferred embodiment, a single LED display array, large enough to serve as a wall-mounted display, is used as a digital clock display 20, and the control unit contents are placed behind it in a single housing, creating a single box which is the entire clock. This choice of components allows inexpensive fabrication. Completing the preferred embodiment is a set of three keys 90, used for commanding the microprocessor to review the call log. The same set of keys allows manual time setting, which allows the clock to be used even if it is not connected to a Caller ID telephone line.

Figure 2:
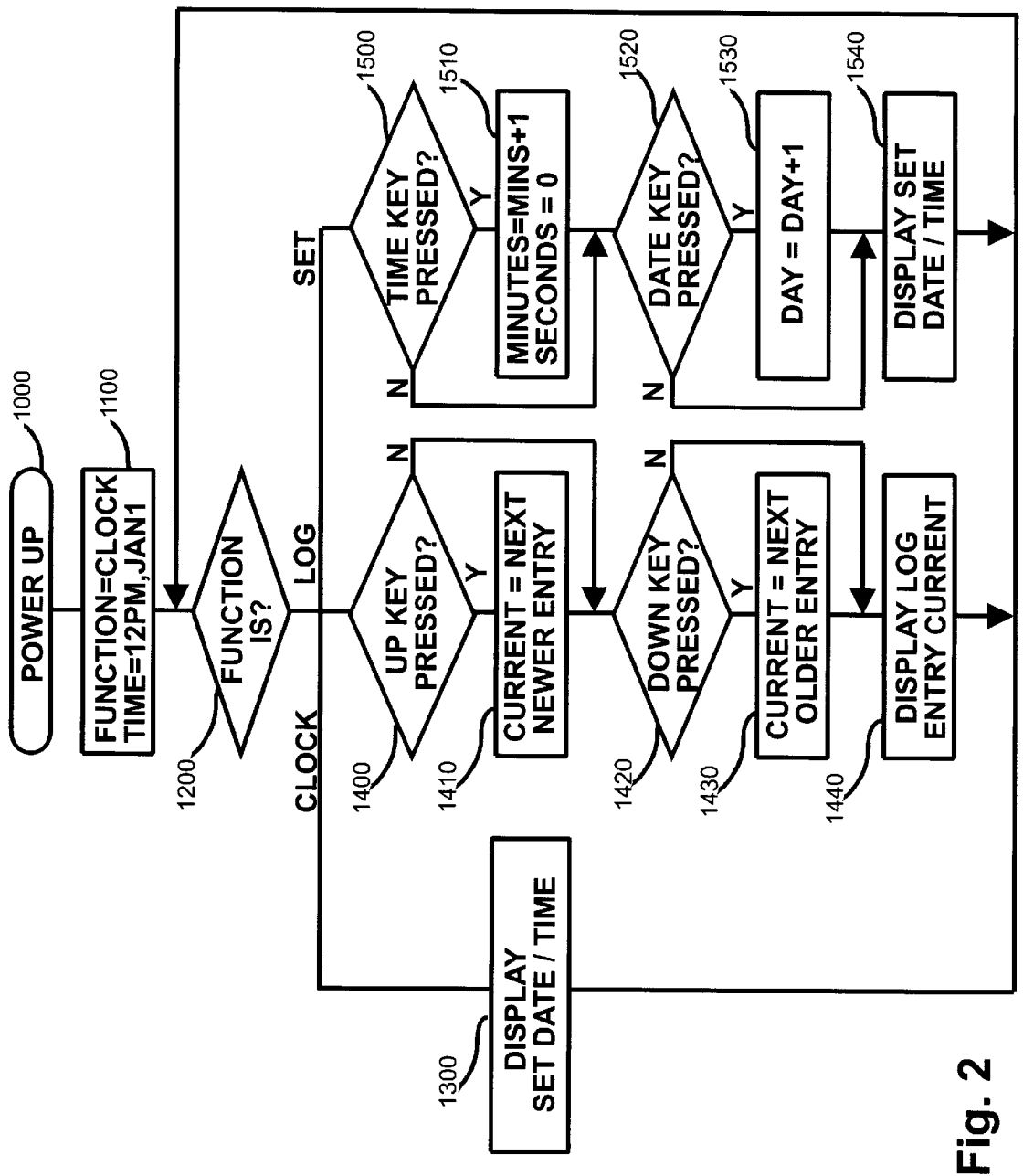
FIG. 2 is a flowchart of the software program running in the microprocessor according to the present invention.

Referring to FIG. 2, the microprocessor's MAIN PROGRAM takes care of local functions. At power-up 1000 leading to initialization 1100, the function is set to "CLOCK" and the time is set to the default, January 1 at 12:00 noon. Thereafter a continuous loop begins. At 1200 the current function is checked.

If the function is "CLOCK", the date and time are updated (if the internal clock routine has changed the time) and displayed 1300 on the LED display, and the program returns to the start of the loop.

If the function is "LOG", the program checks to see if the "UP" key is depressed 1400. If so, the current log entry pointer is incremented 1410. Next the "DOWN" key is checked 1420. If depressed, the current log entry pointer is decremented 1430. Then, in any case, the current log entry is displayed 1440, and the program returns to the start of the loop.

If the function is "SET", the program checks to see if the "TIME" key is depressed 1500. If so, the current minute is incremented, the current second is set to 0, and the current hour is incremented if required 1510. At 1520 the "DAY" key is checked. If depressed the current date is incremented by one day 1530. Then in any case the set date/time is redisplayed at 1540, and the program returns to the start of the loop.

Figure 3:
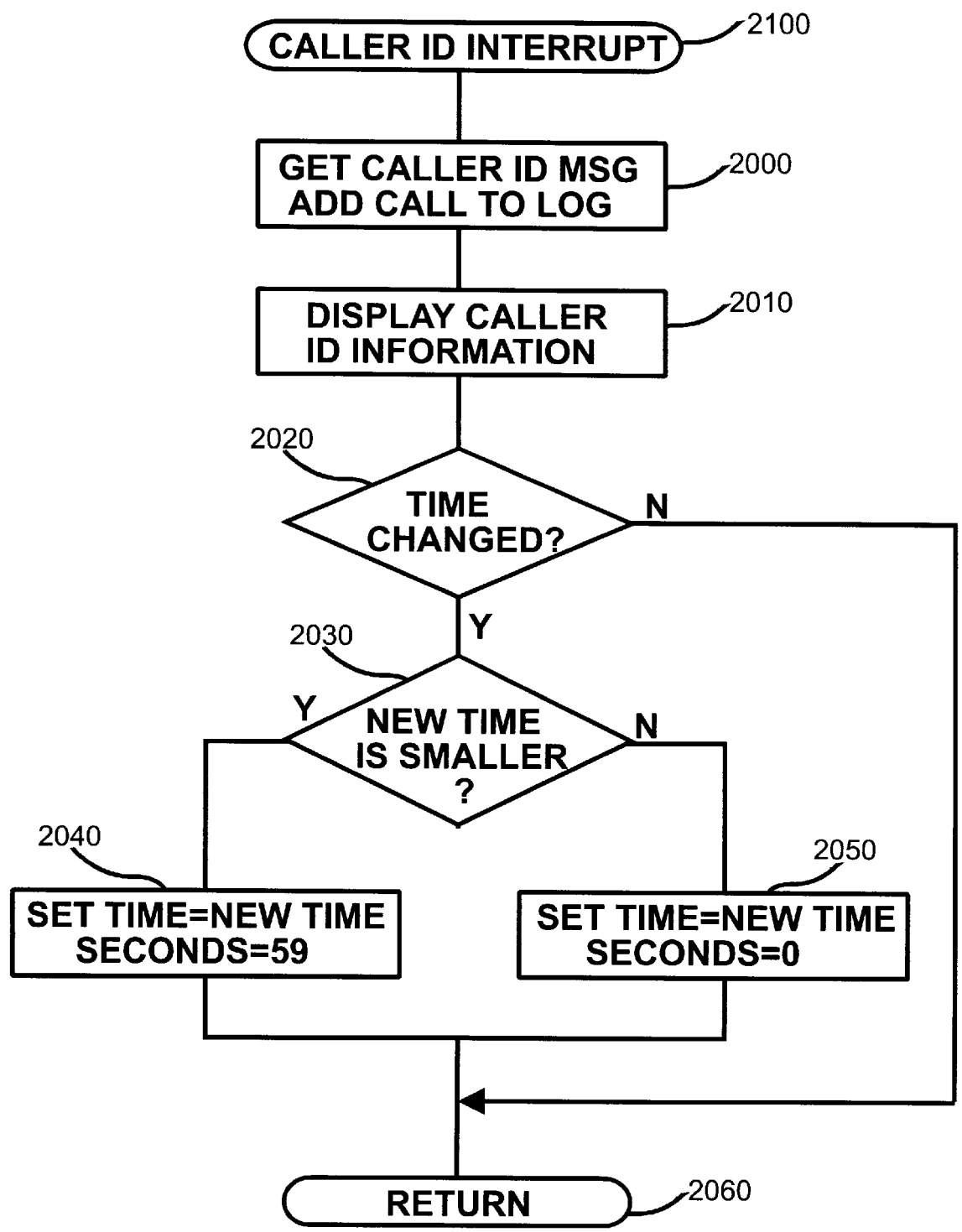
FIG. 3 is a flowchart of the software program's Caller ID interrupt handler routine according to the present invention.

Referring to FIG. 3, the microprocessor receives an interrupt at 2100 from the Caller ID chip when an identification has been received. At 2000 the incoming Caller ID is queried from the chip, and stored as the most recent entry in the log. At 2010 the identification is displayed on the LED display. If the time stamp on the received call does not differ from the program's current stored date and time at 2020, the routine ends, otherwise the program determines how to correct the time (and date) at 2030. If the received time is smaller than the time stored, the received time is stored, and the second counter on the stored time is set to the maximum amount possible within that minute at 2040. Otherwise the new time is stored with seconds set to 0 at 2050. The routine returns to the main program.

The above algorithm allows the clock to be synchronized in seconds (plus or minus about 1 second) over the long term to the central clock maintained by the telephone service provider, despite the fact that the Caller ID service delivers a time stamp containing only hours and minutes. If the Caller ID service is upgraded to include seconds in the time stamp, a further division and hence greater accuracy would become possible. Furthermore the synchronization recognizes and adjusts for discontinuities such as leap-seconds and daylight-saving time, insofar as they are recognized by the service provider's clock, guaranteeing a reasonably accurate clock for Caller ID customers without the need for the customer to manually adjust the time. Additionally, in the preferred embodiment presented here, both clock time and caller identification can be made visible to an entire room, thus aiding individuals who do not happen to be next to the telephone when it rings, or aiding groups of people, for example, when they do not have individual extension numbers for each person.

The preferred embodiment offered here is not the only possible embodiment, and other embodiments of the same invention will become obvious to those skilled in the art, and are intended to be included within the scope of the invention, as defined by the following claims.

We claim:

1. A clock displaying the date, the time, or both the date and the time comprising:

A means for measuring the passage of time;

A means for storing and updating a putative current date and time;

A means for receiving and decoding Caller ID information packets from incoming telephone calls on an external telephone line;

An algorithm for correcting said current date and time with information extracted from said Caller ID information packets;

A means for displaying said current date, said current time, or both said current date and time.

2. The clock according to claim 1 where said means for display consist of more than one similar or dissimilar display units.

3. The clock according to claim 1 where said means for measuring the passage of time is a microprocessor, and said means for receiving and decoding Caller ID information packets is a Caller ID decoder chip, and said means for display is an LED array, and said storage, correction, and display of said putative date and time is carried out by a firmware program residing in said microprocessor, or by a firmware program residing in non-volatile memory readable by said microprocessor.

4. The clock according to claim 1 where said algorithm is also capable of displaying caller number information extracted from said packets on said display means.

5. The clock according to claim 4 also comprising means to store and reproduce on said display historical information of said packets stored in a call log.

* * * * *